Patented Oct. 4, 1949

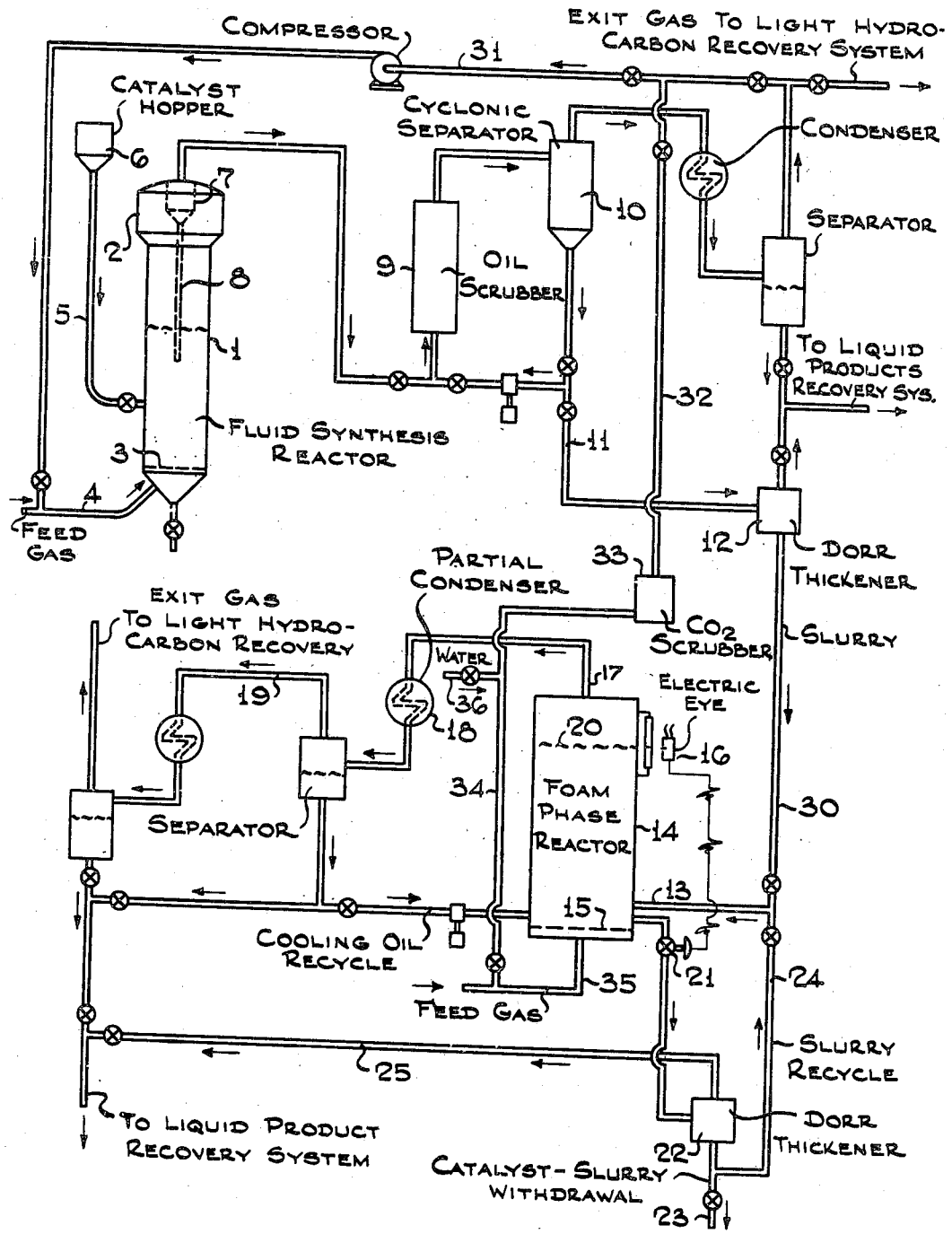

2,483,771

UNITED STATES PATENT OFFICE 2,483,771

TWO-STAGE PROCESS FOR THE SYNTHESIS OF HYDROCARBONS

Clinton H. Holder, Cranford, N. J., assignor to Standard Oil Development Company, a corporation of Delaware Application January 2, 1948, Serial No. 291

9 Claims. (Cl. 260—449.6)

The present invention is concerned with the synthesis of hydrocarbons and of oxygenated hydrocarbons. The invention is more particularly concerned with an operation in which partially spent and exhausted catalyst from one type of hydrocarbon synthesis process is economically utilized as catalyst for another type of hydrocarbon synthesis process.

In the well-known process of producing valuable liquid hydrocarbons and oxygenated hydrocarbons by means of contacting the synthesis gas mixture of CO and $H_2$ with a dense bed of turbulent fluidized catalyst particles, the product stream comprising the reaction products, unreacted gases, and catalyst fines generally pass in the upper head of the reactor through a gas-solids separator, such as a cyclone, which is provided with a return line or dip pipe. In this equipment the greater part of the catalyst fines and entrained catalyst particles is removed from the gas stream and returned to a point well below the level of catalyst in the dense bed.

One of the problems met with in this type of operation is the recovery of any catalyst particles, particularly fines, that may have been entrained in the product stream and not removed by the cyclone or other gas-solids separating device. To prevent such minor proportion of the catalyst that remains suspended in the vapors leaving the gas-solids separator from contaminating the liquid product, it is customary to contact the product vapors with a circulating oil stream to scrub out the remaining catalyst from the product stream. The resultant slurry is then concentrated by some conventional process, such as thickening, and the recovered catalyst is then discarded or regenerated.

In accordance with the present invention, however, the catalyst suspended in the slurry is not subjected to a cumbersome recovery and doubtfully economic regeneration process but is used directly in slurry form as a foam-phase hydrocarbon synthesis catalyst. The synthesis of hydrocarbons using the liquid or foam phase technique of operation offers an attractive method for the synthesis of high-boiling petroleum products such as Diesel oil, waxes, and lubricating oil, and high molecular weight oxygenated hydrocarbons, which products when formed in large quantities in the fluidized solids process would condense in the reaction zone. The process therefore has application in a lower temperature range where the fluid technique would be inoperable. When using this technique, catalyst disintegration and carbon formation are not serious problems such as in the fluid process where poor fluidization and poor temperature control result.

The invention affords a particularly attractive method for manufacturing valuable high melting paraffin waxes, ranging in melting point from 200–250° F. It is not generally desirable to produce these waxes, which are usually unavailable from natural petroleum sources, in a commercial hydrocarbon synthesis plant because the gasoline accompanying large scale wax production is very low in octane number. Consequently a wax producing process would be most attractive if it can be combined with and be an integral part of a large high temperature hydrocarbon synthesis plant which is primarily devoted to the production of high octane gasoline and oxygenated products.

The so-called foam phase operation involves the passage of reactants, such as CO and $H_2$, through a plate with fine pores in the bottom of the reactor, and up through the catalyst-oil slurry. The heat of the reaction is generally removed by external cooling and recirculation of this slurry or by cooling tubes within the reactor. The present invention refers to a method of supplying catalyst to a slurry type foam phase reactor. Instead of discarding the thickened catalyst-oil stream from the fluid solids hydrocarbon synthesis reactor, the catalyst fines-oil slurry is used as catalyst or part of the catalyst in a liquid phase operation. The exit gases from the fluid solids hydrocarbon synthesis reactor are freed of the bulk of entrained catalyst particles in cyclones or other type of gas-solids separators, then pass to an oil scrubbing device where the exit gas is substantially freed of catalyst fines. The oil and catalyst fines then pass to a centrifugal separator and the resulting slurry passes to a thickening device, such as a Dorr thickener, from which purified scrubber oil is returned to the scrubber. The thickened catalyst-oil stream is then sent to a liquid phase hydrocarbon synthesis unit either at the same site or at a different location. The catalyst fines may pass continually to the liquid phase system, with or without additional catalyst from another source. Thus the fines pass in series flow from the fluid unit to the liquid phase unit and then are discarded.

Though both the fluidized solids and the liquid or foam phase techniques for producing valuable hydrocarbons and oxygenated hydrocarbons from CO and $H_2$ are known in the art, the novelty of the present invention which utilizes the waste fines of the former operation as active catalyst for the latter operations, has considerable advantages over the art hitherto disclosed. One of the problems encountered in the foam phase or slurry type of hydrocarbon synthesis operation is the maintenance of a uniform distribution of the catalyst which is suspended in the liquid phase. Using an iron catalyst having a bulk density of about 2.0, difficulties have been encountered by previous workers in keeping the catalyst suspended, and thus contacting of the reactant gases with the catalyst has been rather poor. Where cobalt catalyst was used, the bulk density was of the order of about 0.4, the catalyst rose to the surface of the oil, and again a uniform distribution was not obtained. With the slurry catalyst of the present invention, in which the partially carbonized fines have a bulk density of 0.5–1.2 gms./cc., the fines disperse far more uniformly in the oil phase and thus permit better contacting between the slurry and the synthesis gas.

Low catalyst capacity is another serious problem in the liquid phase operation. The finely divided catalyst of the present invention permits a greater feed throughput due to the greater surface area provided by the fine catalyst particles of approximately 0–10 micron size.

Another advantage of the present invention is the relatively high alkali promoter content of the fines suspended as a slurry as against the promoter content of the catalyst in the fluid solids reactor. Thus when using ammonia synthesis type of catalyst in the synthesis zone having 1.5–2.0% $K_2O$ it has been found that the fines from this system are rich in promoter to the extent of about 2–3% $K_2O$. By the term "ammonia synthesis catalyst" reference is had to fused and reduced high purity magnetite containing a small amount of alumina and potassium compound promoter. Inasmuch as the foam phase technique yields relatively large amounts of organic acids, the high promoter content of the slurry catalyst of the present invention counteracts the loss of such promoter due to formation of organic salts or other compounds of promoter and acid.

The catalyst fines that are carried overhead from the fluidized solids reactor not only contain a relatively high proportion of promoter but also are oxidized to a substantial extent. This property is of considerable importance, as oxidized iron catalyzes wax production. Therefore the second stage of the process of this invention may be advantageously used to produce relatively large proportions of high melting waxes. In the wax production feature of the invention it is desirable that the catalyst have an oxide oxygen content of more than 20%, based on the iron, and it may be desirable to add water to the slurry into the feed gases to insure this state of oxidation in a manner disclosed more fully below.

The fluidized catalyst from which the catalyst fines-oil slurry are derived may be any conventional iron hydrocarbon synthesis catalyst, such as alkali metal-promoted sintered pyrites ash, sintered red iron oxide, or other type iron hydrocarbon synthesis catalyst. The solids used in the first, the fluidized, stage of the process, may have a particle size within the range of 10–300 microns, with at least 75% of the particles of a size ranging from 30–200 microns. The catalyst fines may have a particle size smaller than 10 microns and may contain 25–100 wt. % carbon expressed on iron.

The scrubber oil of the invention is preferably a high boiling fraction of the synthesis, with a boiling point of 500° F. and above.

Having set forth the general nature, advantages, and objects of the invention, the latter will best be understood from the more detailed descriptions hereinafter in which reference will be made to the accompanying drawing which is a diagrammatic representation of a system suitable to carry out a preferred embodiment of the invention.

Referring now in detail to the accompanying drawing, 1 is a reactor preferably in the form of a vertical cylinder with a conical base and an upper expanded section 2, and having a grid or screen 3 located in the lower section to effect good gas distribution. A synthesis gas feed mixture of $H_2$ and CO in synthesis proportions is introduced into the reactor through line 4 and flows upward through screen 3.

Within the reaction vessel 1 a mass of iron catalyst, such as reduced alkali metal-promoted sintered pyrites ash or ammonia synthesis type catalyst is maintained in the form of a powder, having a particle size distribution such that less than 20% of these particles have diameters 0–20 microns, and all of the material is finer than 80 mesh. This catalyst may be supplied to the reactor 1 through line 5 from catalyst hopper 6. The linear velocity of the gases within the reactor 1 is kept within the approximate range of 0.3 to 5 feet per second, preferably within an upper limit of 1.5 feet per second. Under these circumstances the catalyst assumes the form of a dense, turbulent mass, having a well-defined upper level and an apparent density of about 30 to 150 lbs./cu. ft., depending upon fluidization conditions. The pressure within the reactor may vary from subatmospheric to more than 100 atmospheres, depending upon the type of conversion product desired, and the reaction temperature, which may be controlled with the aid of cooling tubes located in the dense phase of the catalyst bed, is kept uniform at about 600–750° F.

When entering the enlarged section 2 of the reactor 1 the gas velocity is sufficiently decreased so that the gases will no longer support any substantial quantity of catalyst, and most of the coarser particles entrained in the gas drop back into the fluidized mass.

The volatile reaction products, containing as well varying quantities of entrained catalyst fines, are withdrawn through a gas-solids separator 7 which may be a cyclone, filter, or electrical precipitator. The bulk of the entrained catalyst fines is removed in the separator, and is returned to the reactor 1 through dip line 8.

The reaction products plus the remaining catalyst fines are then contacted with an oil stream in a conventional scrubber 9, in which the remaining entrained catalyst powder is removed by circulating heavy product oil in a manner known per se. The mixture of scrubbing oil, catalyst fines, and reaction products is then passed to a cyclonic type separator 10, where the scrubbing oil and fines are separated in the conventional manner from product vapors and gases. The overhead gases from the separator, which are at a temperature of about 500–600° F., are then passed through preheaters, exchangers, and condensers to the product recovery system and the non-condensible tail gases are in part recycled to the synthesis reactor 1 through line 31.

The scrubber oil from the cyclonic separator 10 is pumped through a heat exchanger and recycled to the scrubber 9. A slurry stream is withdrawn from the recycle scrubber oil system and is passed through line 11 to a Dorr thickener 12 preferably operated at atmospheric pressure. The clarified oil may then either be sent to the product recovery system or returned as required to the scrubber oil recirculation system (not shown).

The thickened slurry of heavy product oil and promoted catalyst fines is pumped from the Dorr thickener to the liquid phase reactor 14, which it enters through line 13. Reactor 14 comprises essentially a cylindrical reaction vessel provided with a diaphragm or porous ceramic plate 15 for dispersing the reacting gases, and a liquid level control device, such as an "electric-eye" controller 16 connected to a solenoid valve 21. The temperature maintained in the liquid reaction zone varies in accordance with the nature of the product desired. For synthesizing hydrocarbons of the gasoline boiling range a reactor temperature of 575–600° F. is preferred. If a higher yield of Diesel oil is desired, it is preferable to operate at a lower temperature level, such as 450–500° F. The slurry may be preheated to the desired reaction temperature or it may be introduced at a somewhat lower temperature and brought to reaction temperature in situ.

Carbon monoxide and hydrogen gases in synthesis proportions are introduced into the bottom of the liquid phase reactor 14 after being preheated to the reaction temperature. The gases pass upward and are dispersed by means of the ceramic plate 15 to form a finely dispersed foam which effects intimate contact between the gases and the slurry. The foam is stabilized by the presence of oxygenated compounds in the scrubbing liquid, which lower the surface tension and thus improve the gas-liquid-solid contacting in the liquid phase reaction zone. In this zone the finely divided catalyst is uniformly suspended in the high boiling liquid product contained therein, and conversion of synthesis gas takes place by contacting of the fine bubbles of synthesis gas with the catalyst. For products boiling in the gasoline range, the preferred reaction pressure is about 400 p. s. i. g. and the space velocity of the feed gas is about 100 to 200 volumes of synthesis gas/vol. of reaction space/hour. The $H_2/Co$ ratio of the synthesis gas may vary between 1/1 and 2/1. In order to increase conversion it may be desired to recycle part of the exit gases to the reactor (not shown).

When it is desired to make high melting waxes it is preferable to use in reactor 14 high $H_2/CO$ feed gas, which may be either tail gas from the fluidized solids reactor 1 or fresh synthesis gas. A high $H_2CO$ ratio, in the region of 3–7 $H_2/CO$ is preferred, since such high hydrogen to carbon monoxide ratios favor the formation of saturated paraffins rather than olefins. A high $H_2/CO$ tail gas may be obtained by operating reactor 1 so that CO conversion is about 95% rather than 98–99%, accompanied by other operating variables known in the art, such as reduced recycle and reduced feed ratio to said reactor to maintain a high selectivity to hydrocarbons with the lower CO conversion.

If tail gas is to be used as feed to the liquid phase hydrocarbon synthesis unit 14 it may be withdrawn from recycle gas line 31 through line 32. If necessary, it may be freed from $CO_2$ by passing the gas through a conventional $CO_2$ scrubber 33, the degree of $CO_2$ removal depending on the composition of the tail gas and the operating conditions of the liquid phase reactor. The removed $CO_2$ may be returned to the synthesis gas manufacturing unit (not shown) when the latter is processing natural gas, to lower the feed ratio to the synthesis section, in a manner known per se.

From the $CO_2$ scrubber the tail gas may be passed through line 34 to the feed gas inlet line 35 to the liquid phase reactor 14. Small quantities of an oxidizing medium, preferably water or steam, may be added to the feed gas through line 36. The purpose of this step is to oxidize the particles if necessary so that the oxygen content, based on the iron, is at least 20% as desirable for wax production, since oxide oxygen promotes the formation of wax. The reaction conditions favoring wax production in reactor 14 are pressures above 300 p. s. i. g., preferably about 700 p. s. i. g., and a temperature in the range of from about 350° to about 500° F.

The vaporized synthesis products boiling at a lower temperature than that maintained in the liquid reaction zone and unconverted feed gases pass overhead from reactor 14 through line 17 and to partial condenser 18. In this cooling zone the fraction of the product boiling above about 400° F. is condensed and this material is recycled to the reactor 14 at about 125° F. as a coolant. This recycle product is vaporized in the reaction zone and it takes up the heat of reaction both by its sensible heat and by heat of vaporization. Thus by controlling the rate of recycle, the temperature of the reaction zone 14 may be controlled. This method of cooling is advantageously employed in the foam phase operation as against the prior art, wherein liquid drawn off the top of the reactor is recycled, in that the fine particles in the present process are not carried over, thus avoiding corrosion and erosion of the recycle pump inherent in the prior cooling process. The material not condensed in the partial condenser 14 passes to the product recovery system through line 19.

The level 20 in the liquid phase reactor is maintained by the liquid level control valve 21, which passes the catalyst oil-wax slurry to a second Dorr thickener 22. A stream of thickened oil from Dorr thickener 22 may be withdrawn through line 23 and passed to the oil and wax recovery system (not shown), the balance of the thickened slurry being recycled to reactor 14 through line 24. The amount of slurry sent to the wax recovery system is preferably about equivalent to that being added to the liquid phase reaction system from the fluid catalyst unit through line 13. From Dorr thickener 22 there may also be withdrawn continuously a stream of clarified oil through line 25; this oil is also passed to the products recovery system.

The foregoing description, though illustrating a preferred embodiment of the invention, is not intended to exclude other modifications obvious to those skilled in the art, and which are within the scope of the invention. Thus, the catalyst fines instead of being supplied by the fluid reactor vessel may be supplied by the catalyst regenerator system. The scrubber liquid instead of being a high boiling fraction of the hydrocarbon synthesis reaction may be a high boiling organic liquid from any source. The catalyst fed into the fluidized hydrocarbon synthesis unit may be supported on an inert carrier, such as kieselguhr, bentonite, alumina or silica gel. The catalyst slurry may be fed continuously or intermittently to the liquid reactor, which may or may not be operated directly in conjunction with the fluid unit. In certain cases where a large volume of catalyst is desired, it may be preferable for the product stream to by-pass the gas-solids separator in the fluidized solids reactor. The liquid phase reactor may be a tubular reactor, in which heat of reaction is removed by cooling about the reactor tubes, and feed gas may be mixed with the slurry prior to injection into a conventional (not foam phase) liquid phase reactor.

Instead of withdrawing the spent catalyst-oil-wax slurry from reactor 14 to Dorr thickener 22, the slurry may have its heat exchanged with incoming feed, then cooled, the oil separated from the catalyst and undissolved wax by settling and filtering, and then the catalyst may be extracted with light hydrocarbons to remove heavy wax, all in a manner well known in the art. The extracted catalyst may be recycled to the liquid phase reactor or it may be discarded.

I claim:

1. The process of producing valuable conversion products from carbon monoxide and hydrogen which comprises contacting a mixture of CO and $H_2$ in synthesis proportions and under synthesis conditions with a dense, turbulent mass of finely divided alkali metal salt promoted iron synthesis catalyst fluidized by an upwardly flowing gas in a reaction zone, withdrawing partially oxidized iron catalyst of smaller than fluidizable size from said reaction zone, introducing said withdrawn catalyst into a second reaction zone, maintaining said catalyst in said zone as a suspension in a liquid, feeding to said suspension in said second reaction zone a mixture of CO and $H_2$ in synthesis proportions and under synthesis conditions, and recovering valuable conversion products from both zones.

2. The process of producing hydrocarbons and oxygenated hydrocarbons from CO and $H_2$ which comprises contacting a mixture of CO and $H_2$ in synthesis proportions and under synthesis conditions with a dense fluidized mass of finely divided iron-containing alkali metal salt promoted catalyst in a reaction zone, withdrawing from said zone a product stream in which are entrained partially oxidized iron catalyst particles of less than fluidizable size, scrubbing said catalyst particles from said product stream with a liquid, forming a slurry of said catalyst particles with said liquid, introducing said slurry into a second reaction zone, introducing into said second reaction zone a mixture of CO and $H_2$ in synthesis proportions and under synthesis conditions, and recovering a product containing hydrocarbons and oxygenated hydrocarbons in substantial amounts from said second zone.

3. The process of claim 2 in which said scrubbing liquid is a product of the hydrocarbon synthesis reaction.

4. The process of claim 3 in which said liquid has an initial boiling point above 500° F.

5. The process of claim 2 in which said particles are partially carbonized.

6. The process of claim 2 in which said particles contain a higher percentage of promoter than the catalyst fed to the first reaction zone.

7. The process of claim 2 in which said particles have a bulk density range of 0.5–1.2 gms./cc. and a particle size range of predominantly 0–10 microns.

8. The process of claim 2 in which the feed gas to said second reaction zone comprises a gas having an $H_2/CO$ ratio in the range of from about 3 to about 7 parts carbon monoxide to one part hydrogen.

9. The process of producing high melting waxes from CO and $H_2$ which comprises contacting a mixture of said gases in synthesis proportions and under synthesis conditions with a dense fluidized mass of finely divided iron-containing alkali metal salt promoted catalyst in a reaction zone, withdrawing from said zone a product stream in which are entrained highly oxidized catalyst particles substantially of less than fluidizable size, scrubbing said catalyst particles from said product stream with a liquid, forming a slurry of said catalyst particles with said liquid, introducing said slurry into a second reaction zone, introducing into said second reaction zone a synthesis gas having a composition comprising about 3 to about 7 parts hydrogen to one part carbon monoxide, maintaining a pressure of from about 300 to about 750 p. s. i. g. and a temperature of from about 350° to about 500° F. in said second reaction zone, and recovering a product comprising a substantial amount of high melting wax.

CLINTON H. HOLDER.

REFERENCES CITED

The following references are of record in the file of this patent:

UNITED STATES PATENTS

| Number | Name | Date |
|---|---|---|
| 2,433,072 | Stewart et al. | Dec. 23, 1947 |
| 2,434,537 | Barr et al. | Jan. 13, 1948 |
| 2,438,029 | Atwell | Mar. 16, 1948 |